(12) United States Patent
Lauka et al.

(10) Patent No.: US 11,499,835 B1
(45) Date of Patent: *Nov. 15, 2022

(54) IMAGE ASSISTED DELIVERY

(71) Applicant: Amazon Technologies, Inc., Seattle, WA (US)

(72) Inventors: Wesley Scott Lauka, Seattle, WA (US); Lara Chatterjee Rogers, Seattle, WA (US); Kristopher William Bell, Seattle, WA (US); Ryan Scott Russell, Bellevue, WA (US); Alwin Yu-Hang Lee, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 195 days.

This patent is subject to a terminal disclaimer.

(21) Appl. No.: 16/843,169

(22) Filed: Apr. 8, 2020

Related U.S. Application Data

(63) Continuation of application No. 14/699,751, filed on Apr. 29, 2015, now Pat. No. 10,627,244.

(51) Int. Cl.
*G01C 21/34* (2006.01)
*G06Q 10/08* (2012.01)

(52) U.S. Cl.
CPC ......... *G01C 21/34* (2013.01); *G06Q 10/0833* (2013.01); *G06Q 10/08355* (2013.01)

(58) Field of Classification Search
CPC .............. G01C 21/34; G06Q 10/0833; G06Q 10/08355; G06Q 90/20
See application file for complete search history.

(56) References Cited

U.S. PATENT DOCUMENTS

| | | | |
|---|---|---|---|
| 5,614,913 A | 3/1997 | Nichols et al. | |
| 7,917,153 B2 | 3/2011 | Orwant et al. | |
| 9,256,852 B1 | 2/2016 | Myllymaki | |
| 2002/0059104 A1* | 5/2002 | Fukushima | G06Q 10/087 705/28 |
| 2006/0152339 A1 | 7/2006 | Mercier et al. | |
| 2007/0086665 A1* | 4/2007 | Kim | G06F 16/48 382/239 |
| 2008/0000291 A1 | 1/2008 | Vincent et al. | |
| 2008/0002916 A1* | 1/2008 | Vincent | G06T 3/4053 382/229 |
| 2009/0248688 A1 | 10/2009 | Kim et al. | |
| 2010/0057341 A1 | 3/2010 | Bradburn et al. | |
| 2012/0031096 A1 | 12/2012 | Tseng | |

(Continued)

OTHER PUBLICATIONS

Paul A. Zandbergen, A comparison of address point, parcel and street geocoding techniques, 2007, p. 215-218 (Year: 2007).*

*Primary Examiner* — Resha Desai
*Assistant Examiner* — Ibrahim N El-Bathy
(74) *Attorney, Agent, or Firm* — Thomas | Horstemeyer, LLP

(57) ABSTRACT

Disclosed are various embodiments for image assisted delivery. A computing device may receive a first image from a first client device and a second image from a second client device. The computing device match a location in the first image to a location in the second image. The computing device may subsequently determine a characteristic of a package in the second image and determine that the characteristic of the package corresponds to package information of an order. Then, the computing device may confirm a delivery of the package.

20 Claims, 12 Drawing Sheets

(56) References Cited

U.S. PATENT DOCUMENTS

| | | | |
|---|---|---|---|
| 2014/0168477 A1 | 6/2014 | David | |
| 2014/0316841 A1* | 10/2014 | Kilby | G06Q 10/0833 |
| | | | 705/7.26 |
| 2015/0025490 A1 | 9/2015 | Berger et al. | |
| 2015/0254906 A1* | 9/2015 | Berger | G06V 10/44 |
| | | | 382/101 |
| 2015/0030249 A1 | 10/2015 | Stuckman et al. | |
| 2015/0302495 A1* | 10/2015 | Stuckman | G06Q 10/0835 |
| | | | 705/26.35 |
| 2015/0332206 A1 | 11/2015 | Trew et al. | |
| 2016/0300113 A1* | 10/2016 | Molin | H04N 17/002 |

\* cited by examiner

IMAGE ASSISTED DELIVERY

CROSS-REFERENCE TO RELATED APPLICATIONS

This application is a continuation of, and claims priority to, co-pending U.S. patent application Ser. No. 14/699,751, entitled "IMAGE ASSISTED DELIVERY," filed on Apr. 29, 2015, the contents of the application are hereby incorporated by reference in its entirety.

BACKGROUND

Couriers and other delivery persons are often provided directions to a delivery location using navigation software. This navigation software may provide turn-by-turn directions for a courier to follow from their current location to a delivery destination. Such navigation software may also notify the courier when he or she has reached the delivery destination.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
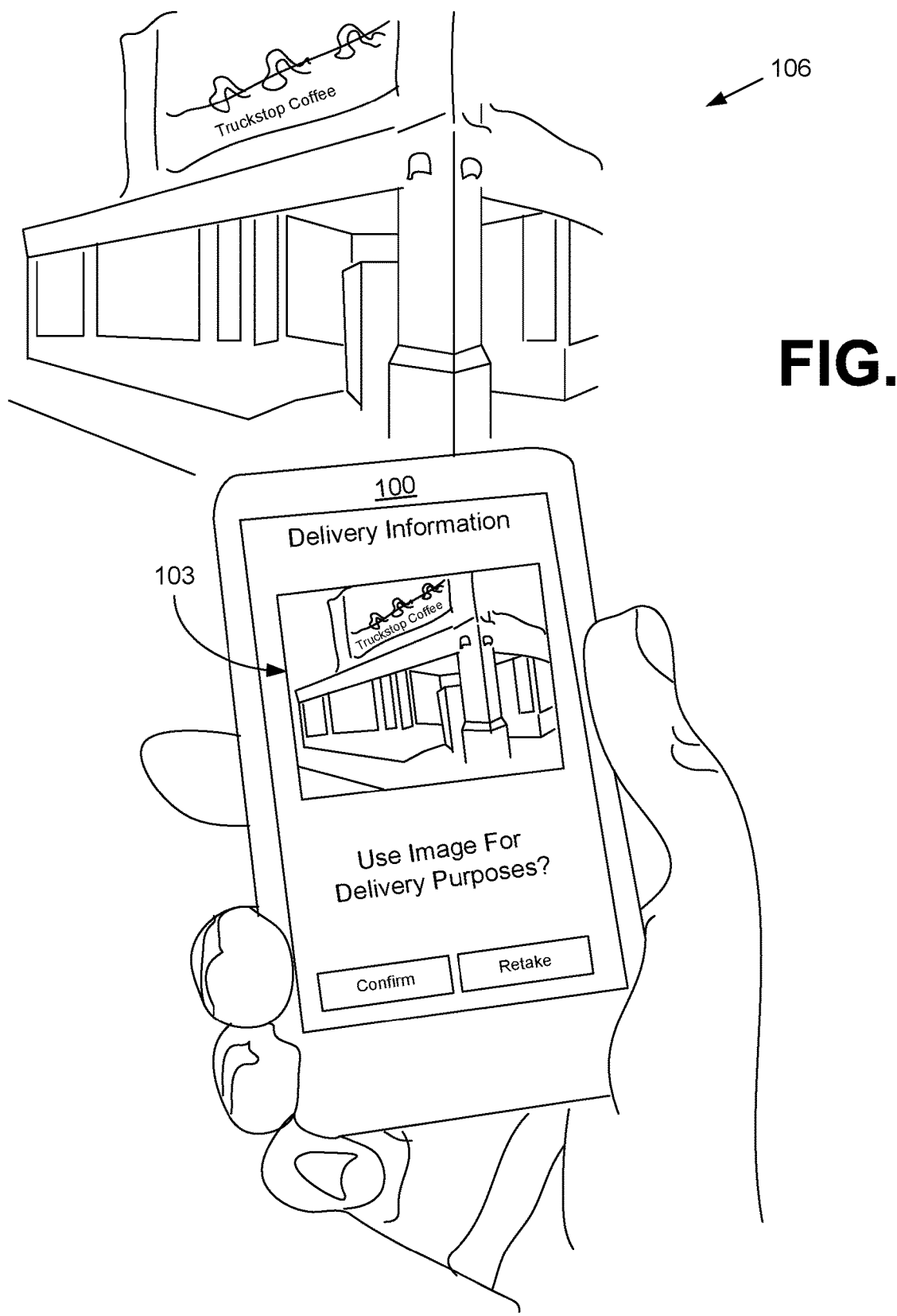
FIG. 1 is a depiction of image assisted delivery according to various embodiments of the present disclosure.

Disclosed are various embodiments for assisting couriers and other personnel in delivering items. In many instances, a customer may wish for a delivery to be made to a delivery location where address information is unavailable and/or inaccurate. For example, the delivery location may correspond to a location that does not have an address, such as a spot in a park, a spot along a road or highway, a spot on a beach, a spot in a parking lot, and/or other locations. Similarly, the delivery location may have an address, but the customer may be unaware of the address. For example, the customer may be in a new or unfamiliar location and without knowledge of or access to the address. In some instances, the customer may know the address, but the address may be inaccurate in some way. For example, a large office park with multiple buildings may have a single address, making delivery to a particular building, office or suite difficult. As another example, mapping and routing software may have an address incorrectly linked to the wrong location, such as a street address being mapped to the wrong house or business.

In some embodiments of the present disclosure, images may be used to improve the delivery process. When a customer places an order for an item that is to be delivered, the customer may be prompted to take a photograph of the intended delivery location. For example, a customer may use the camera embedded in his or her phone to take a picture of a location at which they wish for delivery to occur. This photograph may then be included in the order with other shipping information, such as an address for the delivery.

The image may then be processed in a number of ways. For example, location data, such as latitude and longitude coordinates, may be extracted from metadata embedded in the image file itself. The location data may be used to validate or verify the delivery address or to generate a delivery address. As another example, the image may be compared to previously processed images corresponding to known locations. If the image matches a previously processed image, then the location of the previously processed image may be compared to the delivery address to validate or generate a delivery address. In various embodiments, optical character recognition (OCR) may be performed on the image to identify building numbers, street names, and/or other information that could be used to validate the delivery address or to generate a delivery address.

In some embodiments, the image may be provided to the courier delivering the order. For example, upon reaching the intended delivery destination, the image may be sent to the courier. This may allow the courier to find the delivery location by comparing the image with his or her surroundings.

In the following discussion, a general description of the system and its components is provided, followed by a discussion of the operation of the same. It is understood that the following description pertains to examples of various embodiments of the present disclosure. These examples are provided for illustrative purposes and are not intended to limit the scope of the disclosure to a particular example or embodiment.

With reference to FIG. 1, shown is an illustration of one of the various embodiments of the present disclosure in use by a customer placing an order for items to be delivered to a location. Here, a customer uses a customer client device 100 to capture an image 103 of a delivery location 106, as illustrated. The customer may, for example, capture an image 103 of the building at the address of the delivery location 106. Or, the customer may be requesting delivery at a location that does not have an address, as further described herein, and is capturing an image 103 of the delivery location 106 to provide a courier with a way to determine when he or she has arrived at the correct delivery location 106. The customer can then confirm they want to use the image 103 for delivery purposes.

Figure 2:
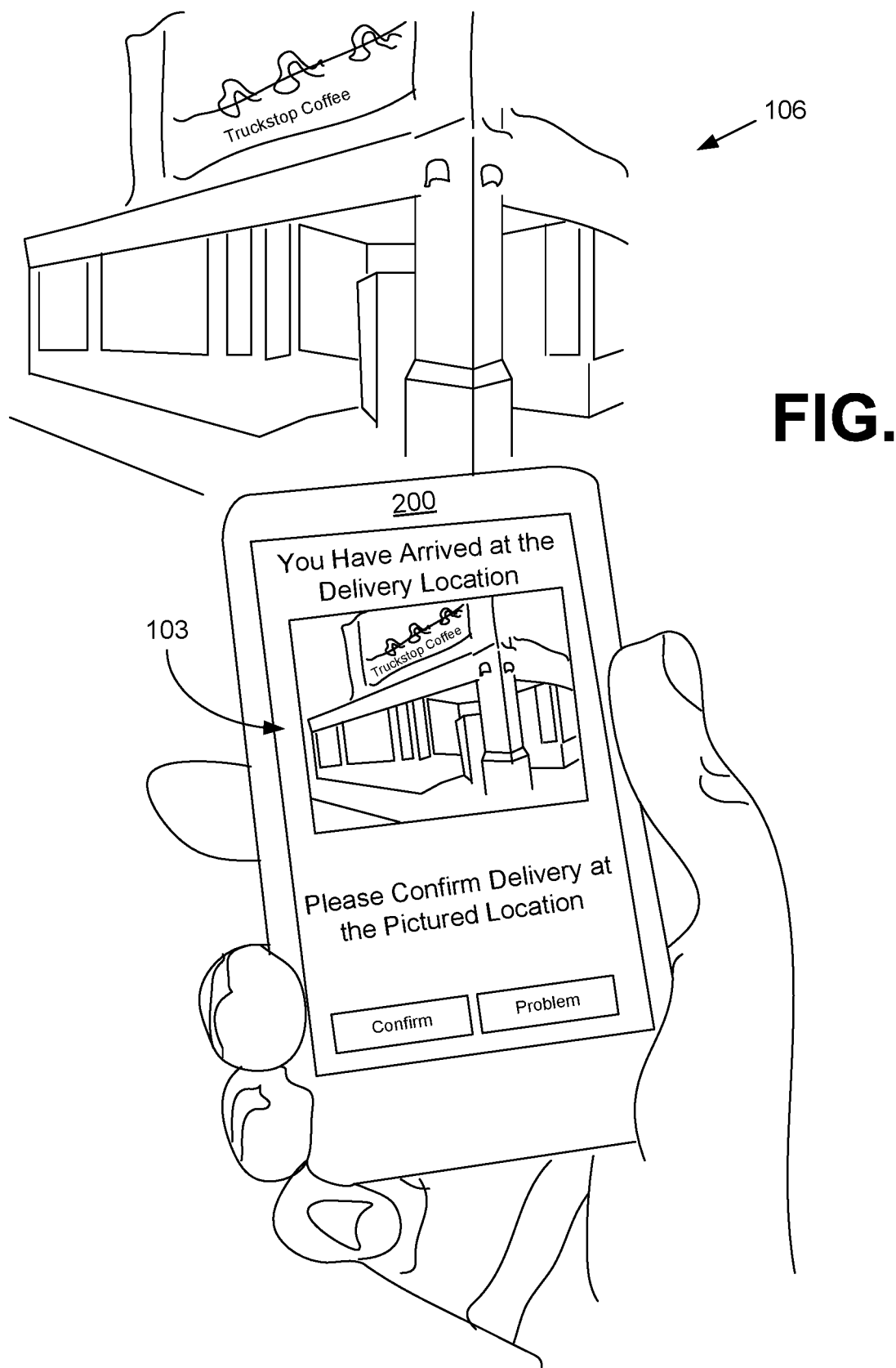
FIG. 2 is a depiction of image assisted delivery according to various embodiments of the present disclosure.

With reference to FIG. 2, shown is an illustration of one of the various embodiments of the present disclosure in use by a courier or other delivery person. Here, a courier uses a courier client device 200 to locate a delivery location 106 for an item or package, as illustrated. The courier client device 200 displays an image 103 of the delivery location 106 when the courier arrives at the delivery location 106. This allows the courier to confirm that they have arrived at the correct delivery location 106. In some embodiments, the courier may be able to use the image 103 to visually confirm that he or she is at the correct delivery location if the delivery location 106 does not have an address and is instead identified by other approaches (e.g., in proximity to a well-known landmark, at a specified set coordinates, or identified with some other approach or reference).

Figure 3:
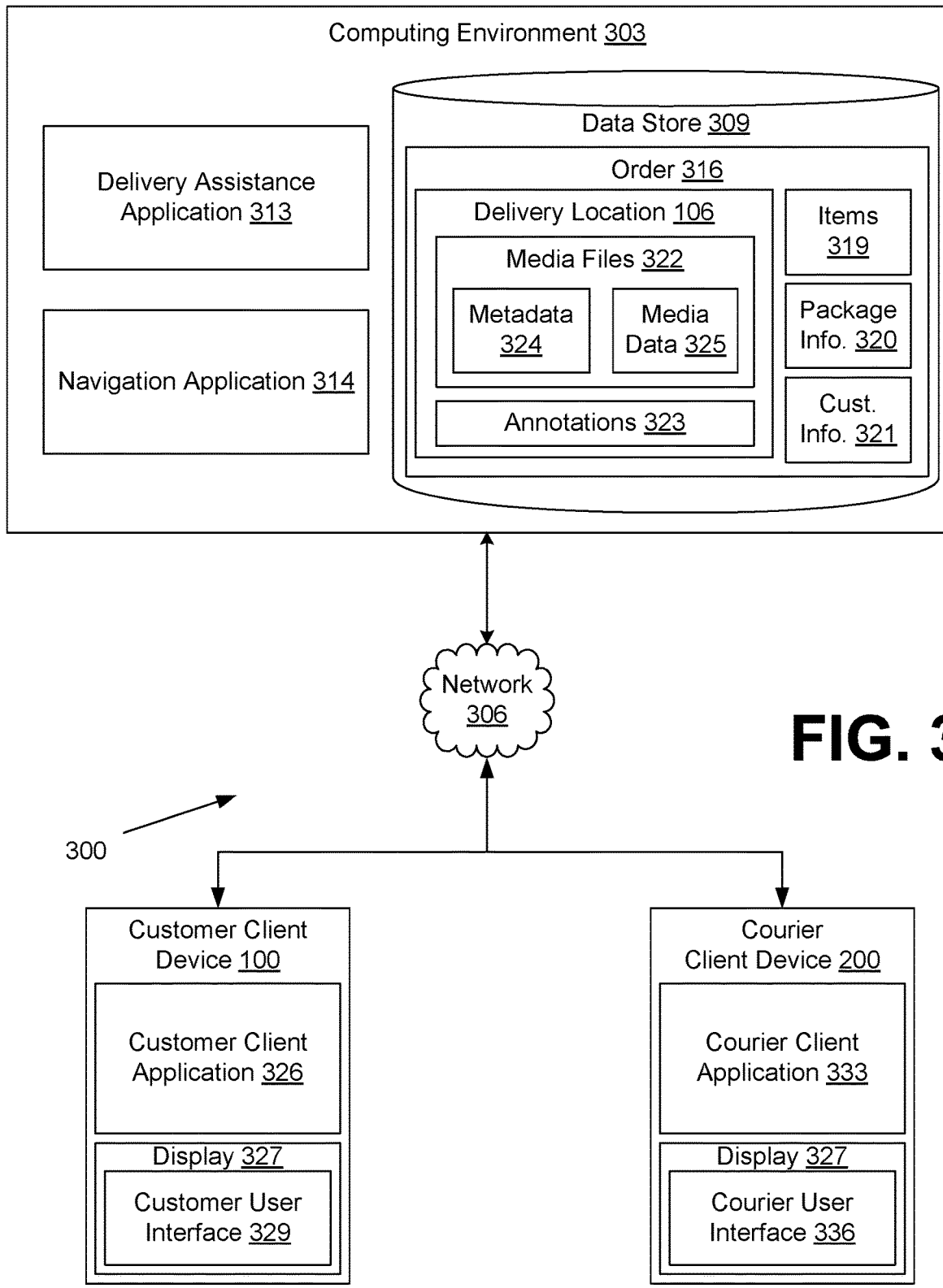
FIG. 3 is a drawing of a networked environment according to various embodiments of the present disclosure.

With reference to FIG. 3, shown is a networked environment 300 according to various embodiments. The networked environment 300 includes a computing environment 303, a customer client device 100, a courier client device 200, and potentially other devices. The computing environment 303, customer client device 100, and/or courier client device 200, may be in data communication with each other via a network 306. The network 306 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 303 may comprise, for example, a server computer or any other system providing computing capability. Alternatively, the computing environment 303 may employ a plurality of computing devices that may be arranged, for example, in one or more server banks or computer banks or other arrangements. Such computing devices may be located in a single installation or may be distributed among many different geographical locations. For example, the computing environment 303 may include a plurality of computing devices that together may comprise a hosted computing resource, a grid computing resource and/or any other distributed computing arrangement. In some cases, the computing environment 303 may correspond to an elastic computing resource where the allotted capacity of processing, network, storage, or other computing-related resources may vary over time.

Various applications and/or other functionality may be executed in the computing environment 303 according to various embodiments. Also, various data is stored in a data store 309 that is accessible to the computing environment 303. The data store 309 may be representative of a plurality of data stores 309 as can be appreciated. The data stored in the data store 309, for example, is associated with the operation of the various applications and/or functional entities described below.

The components executed on the computing environment 303, for example, include a delivery assistance application 313, a navigation application 314, and other applications, services, processes, systems, engines, or functionality not discussed in detail herein. The delivery assistance application 313 is executed to identify a delivery location 106 based at least in part on one or more images 103 provided by the customer client device 100. The navigation application 314 is executed to provide a series of directions to a courier client device 200 that map a path from a current location of the courier client device 200 to the delivery location 106. In some embodiments, the delivery assistance application 313 may also confirm deliveries of items 319.

The data stored in the data store 309 includes, for example, one or more orders 316 and potentially other data. Each order 316 may represent an order placed by a customer for one or more items 319. Each order may include a delivery location 106 where the items 319 are to be delivered. The delivery location 106 may be represented as an address, a landmark (e.g., a park, monument, statue, building, sign, or other landmark), a set of coordinates, or other representation of a location. Each order 316 may also include package information 320 related to shipments of the items 319 in the order 316. Customer information 321 for the customer who placed the order 316 may also be stored in association with each order 316.

Items 319 include various goods and/or services that may be deliverable to the delivery location 106. Goods may include any good that can be purchased, leased, or otherwise consumed. Services may include any service that may requested by a customer to be performed at the delivery location 106.

Package information 320 may include information related to packaging in which one or more of the items 319 may be shipped. Package information 320 may include dimensions such as the length, width, and height of a box, crate, or other shipping container in which one or more of the items 319 are shipped. Package information 320 may also include data such as the material of the shipping container (e.g., cardboard, plastic, wood, or other materials). This may also include, in some embodiments, the color of the shipping container (e.g., blue plastic, white plastic, dark brown cardboard, white cardboard, etc.). Package information 320 may also include data related to external markings or indicators on the shipping container, such as shipping labels, shipping instructions (e.g., "This side up"), shipping warnings (e.g., "Fragile"), and other markings or indicators. Package information 320 may be generated and/or entered as items 319 are assembled for shipment to the delivery location 106, according to various embodiments of the present disclosure.

Customer information 321 may include various types of information related to, describing, or defining the customer who placed the order 316. Customer information 321 may include, for example, the name of the customer, a billing address of the customer, an image of the customer to assist in identifying the customer to whom a package for the order should be delivered, a current location of the customer, and/or potentially other information. In some examples, the combination of the customer information 321 and the delivery location 106 may define the person to whom an order is to be delivered.

Various types and kinds of data related to the delivery location 106 may also be stored in the data store 309. For example, one or more media files 322 representing the delivery location 106 and/or one or more annotations 323 may be stored for a delivery location 106. The media files 322 may correspond to one or more images, videos, or other visual representations that may be linked to the delivery location 106. Each media file 322 may include metadata 324 and media data 325.

Metadata 324 may include descriptive data about the media file 322, such as the date and time that the media file 322 was created, the location depicted in the media file 322, the location where the media file 322 was generated, the person or device that generated the media file 322, the altitude of the customer client device 100 when the media file 322 was generated, the compass orientation of the customer client device 100 when it generated the media file 322, the color saturation and hues of individual pixels or objects in the media file 322, and potentially other data. The metadata 324 may be stored separately from but in association with corresponding media files 322, such as where the metadata 324 is stored as a separate data record from the media file 322. In some embodiments, the metadata 324 may be embedded in the media file 322, such as when the metadata 324 is stored according to one or more versions of the exchangeable image file format ("Exif") specification. The location depicted in the media file 322 and the location where the media file 322 was generated may be stored in a number of formats, including human readable text (e.g., "Statue of Liberty" or "Eiffel Tower") or as a set of coordinates (e.g., 34° 7' 17" North by 84° 30' 22" West)

Media data 325 may include data that represents an image 103 (FIG. 1, FIG. 2) or video of a delivery location 106. For example, media data 325 may include data that represents a photograph of the delivery location 106 stored in one or more formats, such as the portable network graphics (PNG) format, the joint photographic experts group (JPEG) format, a bitmap format, and/or other image formats. As another example, media data 325 may include data that represents a video of the delivery location 106 stored in one or more formats, such as various versions of the moving picture experts group (MPEG) formats, the Theora™ format, the QuickTime® format, and various other formats.

The media files 322 may have been provided, for example, by one or more customer client devices 100 and/or one or more courier client devices 200, as will be further described herein. For example, an image 103 (FIG. 1) may have been provided by a customer client device 100 when the customer placed an order 316. Similarly, a second image 103 may have been provided by a courier client device 200 when the courier confirmed delivery of the items 319 included in the order 316. In some embodiments, the media files 322 may also represent multiple images or videos of the delivery location 106 from different perspectives, angles, and/or distances. The media files 322 may also include images or videos of the delivery location 106 taken at different times of day, different times of the year, and/or at other various points of time.

The annotations 323 may represent various notes related to the delivery location 106 and/or the order 316. These notes may include text data (e.g., written notes) as well as multimedia data or files (e.g., audio files for voice notes or video files illustrating an issue). For example, customers may add notes to aid couriers when delivering an order 316 to a particular delivery location 106, e.g., by identifying a particular spot within an image of the delivery location 106, by providing audio instructions/directions to the delivery location 106, or by providing a temporary access code for a secure location. In addition, where delivery was requested at the garage of a house, but a package was instead delivered to the front porch (e.g., it was raining at delivery and the front porch is covered), a courier may create an annotation 323 to represent this change to the customer. Other notes intended for couriers only may also be stored as annotations 323 for a delivery location 106. These additional notes may be intended to make future deliveries to the delivery location 106 by other couriers easier. For example, a courier may make an annotation 323 for a delivery location that a large dog lives in the backyard of a house at a particular delivery location 106 such that couriers making future deliveries to the delivery location 106 should not leave packages on the back step or back porch, even if specifically requested by the customer.

The customer client device 100 and the courier client device 200 are representative of a plurality of client devices that may be coupled to the network 306. The customer client device 100 and/or the courier client device 200 may include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The customer client device 100 and/or the courier client device 200 may include a display 327. The display 327 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The customer client device 100 may be configured to execute various applications such as a customer client application 326 and/or other applications. The customer client application 326 may be executed in a customer client device 100, for example, to access network content served up by the computing environment 303 and/or other servers, thereby rendering a customer user interface 329 on the display 327. The customer client device 100 may also be configured, for example, to send content to the computing environment 303. To this end, the customer client application 326 may include, for example, a browser, a dedicated application, etc., and the customer user interface 329 may comprise a network page, an application screen, etc. The customer client device 100 may be configured to execute applications beyond the customer client application 326 such as, for example, email applications, social networking applications, word processors, spreadsheets, and/or other applications.

The courier client device 200 may be configured to execute various applications, such as a courier client application 333 and/or other applications. The courier client application 333 may be executed in a courier client device 200, for example, to access network content served up by the computing environment 303 and/or other servers, thereby rendering a courier user interface 336 on the display 327. The courier client device 200 may also be configured, for example, to send content to the computing environment 303. To this end, the courier client application 333 may include, for example, a browser, a dedicated application, etc., and the courier user interface 336 may comprise a network page, an application screen, etc. The courier client device 200 may be configured to execute applications beyond the courier client application 333 such as, for example, email applications, social networking applications, word processors, spreadsheets, and/or other applications.

Next, a general description of the operation of the various components of the networked environment 300 is provided. To begin, a customer creates an order 316 for one or more items 319 to be delivered to a delivery location 106. In some embodiments, the order 316 may be created using the customer client application 326 executing on the customer client device 100. In some embodiments, the customer may be prompted to specify the delivery location 106, such as by supplying an address for the delivery location. In other embodiments, the delivery location 106 may be determined using geolocation circuitry on the customer client device 100 to determine a current set of coordinates for the customer client device 100. The customer may additionally be prompted to capture one or more images 103 (FIG. 1) or videos of the delivery location 106. These images 103 may be used to create one or more media files 322, which may be uploaded to the data store 309 in the computing environment 303.

The delivery assistance application 313 then analyzes the one or more media files 322 to identify the delivery location 106. In some embodiments, as further described herein, the received media files 322 may be analyzed to determine that the location depicted in the received media files 322 matches the information for the delivery location 106 provided by the customer client application 326. In various embodiments, as further described herein, the received media files 322 may be analyzed to determine the delivery location 106 when no other information regarding the delivery location 106 has been provided by the customer client application 326. If a discrepancy between the identifying information of the delivery location 106 received from the customer client application 326 and the delivery location 106 determined from the analysis of the media files 322 provided by the customer client application 326 is detected, a message may be sent to the customer client device 100 to prompt the customer to resolve the discrepancy.

When a courier indicates that he or she is in possession of the items 319 to be delivered, the courier client application 333 sends the current position of the courier client device 200 to the navigation application 314. The navigation application 314 provides a series of directions to the courier client application 333 mapping a route from the current positon of the courier client application 333 to the delivery location 106. When the courier client application 333 determines that the courier client device 200 is in proximity to the delivery location 106, the courier client application 333 may query the delivery assistance application 313 for one or more media files 322 depicting the delivery location 106. This determination may be made, for example, by the courier client application 333 comparing a current location of the courier client device 200, as reported by geolocation circuitry included in the courier client device 200, to the final position in the series of directions provided by the navigation application 314. When the courier client device 200 is in proximity to the delivery location 106, the courier client application 333 may then cause one or more of the received media files 322 to be rendered on the display 327 of the courier client device 200 as part of the courier user interface 336.

In some embodiments, the courier client application 333 may also prompt the courier to confirm delivery of the items 319 at the delivery location 106. For example, the courier client application 333 may cause the courier to be prompted to take a photograph or video of the items 319 at the delivery location 106. The photograph or video may be sent to the delivery assistance application 313. The delivery assistance application 313 may compare, as further described herein, the photograph or video with one or more media files 322 to determine that the location photographed or videoed by the courier matches the delivery location 106. The delivery assistance application 313 may also analyze the photograph or video to determine whether the dimensions or characteristics of the package(s) of items 319 match the package information 320 for the order 316. This allows the delivery assistance application 313 to determine whether the correct items 319 were delivered by the courier.

Figure 4A:
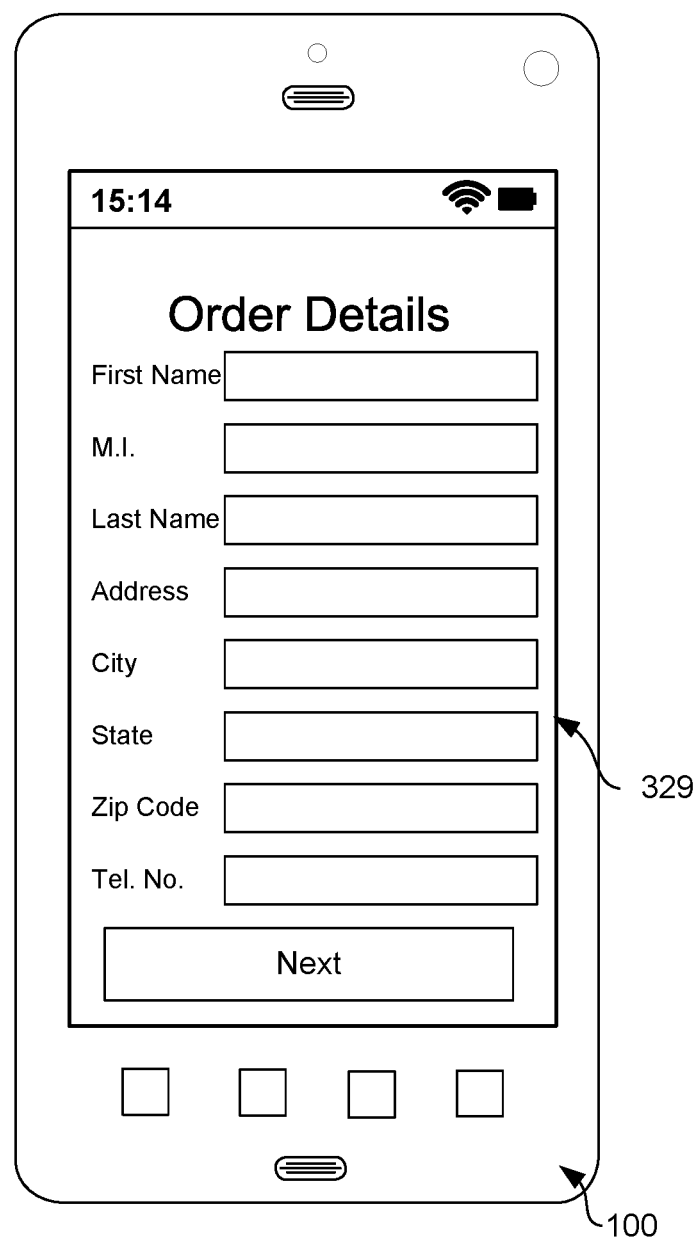
FIG. 4A is a pictorial diagram of an example user interface rendered by a client in the networked environment of FIG. 3 according to various embodiments of the present disclosure.

Referring next to FIG. 4A, shown is an example of the customer user interface 329 rendered by the customer client application 326 (FIG. 3) executing on the customer client device 100, according to various embodiments of the present disclosure. Here, a customer attempting to place an order 316 is prompted to enter various details about the order 316. For example, the customer may be prompted by the customer user interface 329 to enter his or her name and the address of the delivery location 106 (FIG. 3) to which the order 316 is to be delivered. Other details and/or additional information may also be requested and submitted using the customer user interface 329 in various embodiments of the present disclosure.

In some embodiments, one or more values of the fields in the user interface 329 may be automatically completed by the customer client application 326. For example, customer client application 326 may use geolocation circuitry included in the customer client device 100, such as a global positioning system (GPS) receiver, to determine the current latitude and longitude of the customer client device 100. The customer client application 326 could submit the latitude and longitude to the navigation application 314 and/or the delivery assistance application 313 and receive in response an address (e.g., 123 Main Street, Any Town, Some State, 01234) or landmark (e.g., a park, a venue, a building, or other landmark) associated with latitude and longitude of the customer client device 100. The customer client application 326 could then populate the appropriate fields (e.g., the address fields) based on the received location data.

Figure 4B:
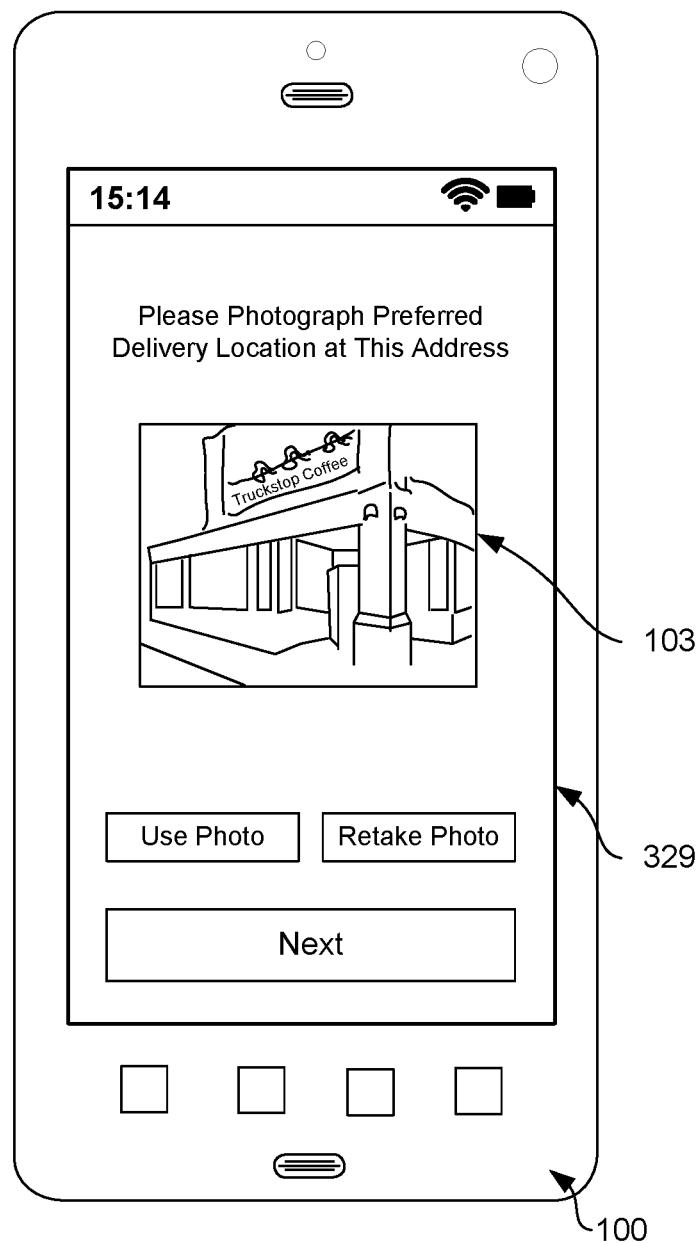
FIG. 4B is a pictorial diagram of an example user interface rendered by a client in the networked environment of FIG. 3 according to various embodiments of the present disclosure.

Turning now to FIG. 4B, shown is an example of the customer user interface 329 rendered by the customer client application 326 (FIG. 3) executing on the customer client device 100, according to various embodiments of the present disclosure. As illustrated, the customer user interface 329 may prompt a customer to capture an image 103 of the delivery location 106 (FIG. 3). The image 103 may correspond to a photograph, a series of photographs (e.g., a panorama), and/or a video of the delivery location 106, according to various embodiments of the present disclosure. The image 103 may be generated, for example, using a camera or other image acquisition circuitry included in the customer client device 100. In some embodiments of the present disclosure, a preview of the image may be rendered within the user interface 329 for a customer to approve. In some instances, the customer may also include various notes or annotations 323 regarding the delivery location 106. For example, the customer may identify a particular spot for the order 316 within an image of the delivery location 106, may provide audio instructions/directions to the delivery location 106, or may provide a temporary access code for a secure location at the delivery location 106. The notes may be represented as text (e.g., a written note), audio (e.g., a voice recording of the customer), video (e.g., a short video illustrating instructions), or in other forms.

In some embodiments, the customer client application 326 (FIG. 3) may also make suggestions to the customer based on the current latitude and longitude of the customer client device 100 as previously described above. For example, the customer client application 326 may suggest that the customer take a photograph or video from a particular angle or of a particular building, landmark, or other feature. As an example, the customer client application 326 may query the delivery assistance application 313 to identify media files 322 of the delivery location 106 taken by other customers, retrieve one or more of the identified media files 322, and display the one or more identified media files 322 to the user as an example of a photograph or video that the user should take. Alternatively, the customer client application 326 may present an image 103 for the user to use based on one or more of the identified media files 322 retrieved by the customer client application 326. The customer could then use a photograph or video taken by a previous user for the delivery location 106 or could choose to take a new photograph or video to use, along with any annotations 323 desired by the customer.

Figure 4C:
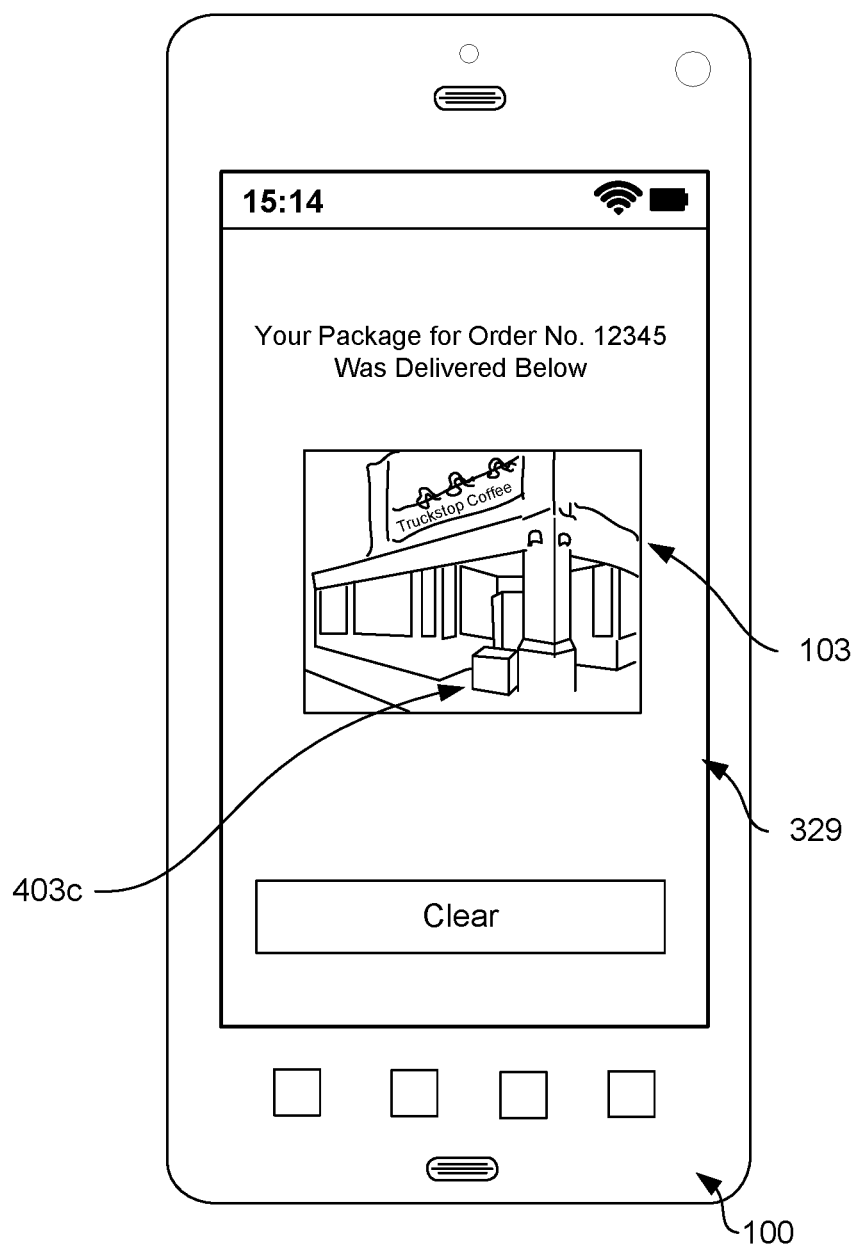
FIG. 4C is a pictorial diagram of an example user interface rendered by a client in the networked environment of FIG. 3 according to various embodiments of the present disclosure.

Moving on to FIG. 4C, shown is an example of the customer user interface 329 rendered by the customer client application 326 (FIG. 3) executing on the customer client device 100, according to various embodiments of the present disclosure. Here, the customer client application 326 is causing a delivery confirmation to be rendered within the customer user interface 329, along with any applicable annotations 323 received from the courier. As part of the delivery confirmation, an image 103 of the delivery location 106 (FIG. 3) is depicted within the customer user interface 329. As illustrated, the image 103 depicts a package 403c placed at the delivery location 106. The image 103 with the package 403c may, for example, have been generated with the courier client application 333 in order for a courier or other delivery person to confirm that items 319 (FIG. 3) included in an order 316 (FIG. 3) had been delivered at the requested delivery location 106.

Figure 5A:
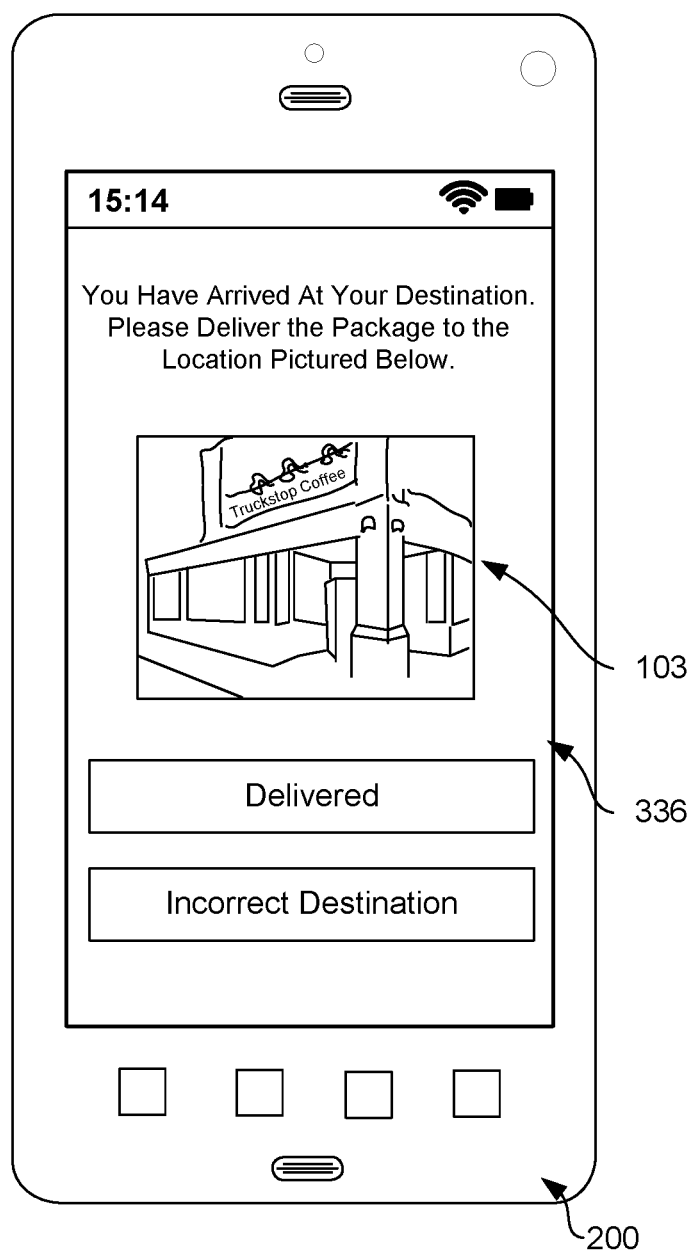
FIG. 5A is a pictorial diagram of an example user interface rendered by a client in the networked environment of FIG. 3 according to various embodiments of the present disclosure.

Referring next to FIG. 5A, shown is an example of the courier user interface 336 rendered by the courier client application 333 (FIG. 3) executing on the courier client device 200, according to various embodiments of the present disclosure. Here, courier client application 333 has caused an image 103 of the delivery location 106 (FIG. 1) to be rendered once a courier has reached the delivery location 106, along with any applicable annotations 323 received from the customer. By causing the image 103 of the delivery location to be rendered, the courier may be able to quickly and accurately deliver items 319 (FIG. 3) of an order 316 (FIG. 3) to the correct delivery location 106.

In some embodiments, the courier user interface 336 may also include additional prompts. For example, as illustrated, the courier user interface 336 may include a prompt for the courier to confirm that they have delivered the items 319 to the delivery location 106. In some embodiments, such as the one illustrated in FIG. 5A, the courier user interface 336 may also include a prompt for the courier to note that the delivery location 106 is incorrect. For example, an address may be linked to an incorrect delivery location 106, such as a house address being mapped to an office park, or the wrong address may have been supplied for the intended delivery location 106 due to user error. As such, when the courier arrives at the expected delivery location 106, there may be no landmarks, features, or buildings that match the image 103. Therefore, the courier may be prompted to note the error so that it may be resolved using one or more approaches described herein.

Figure 5B:
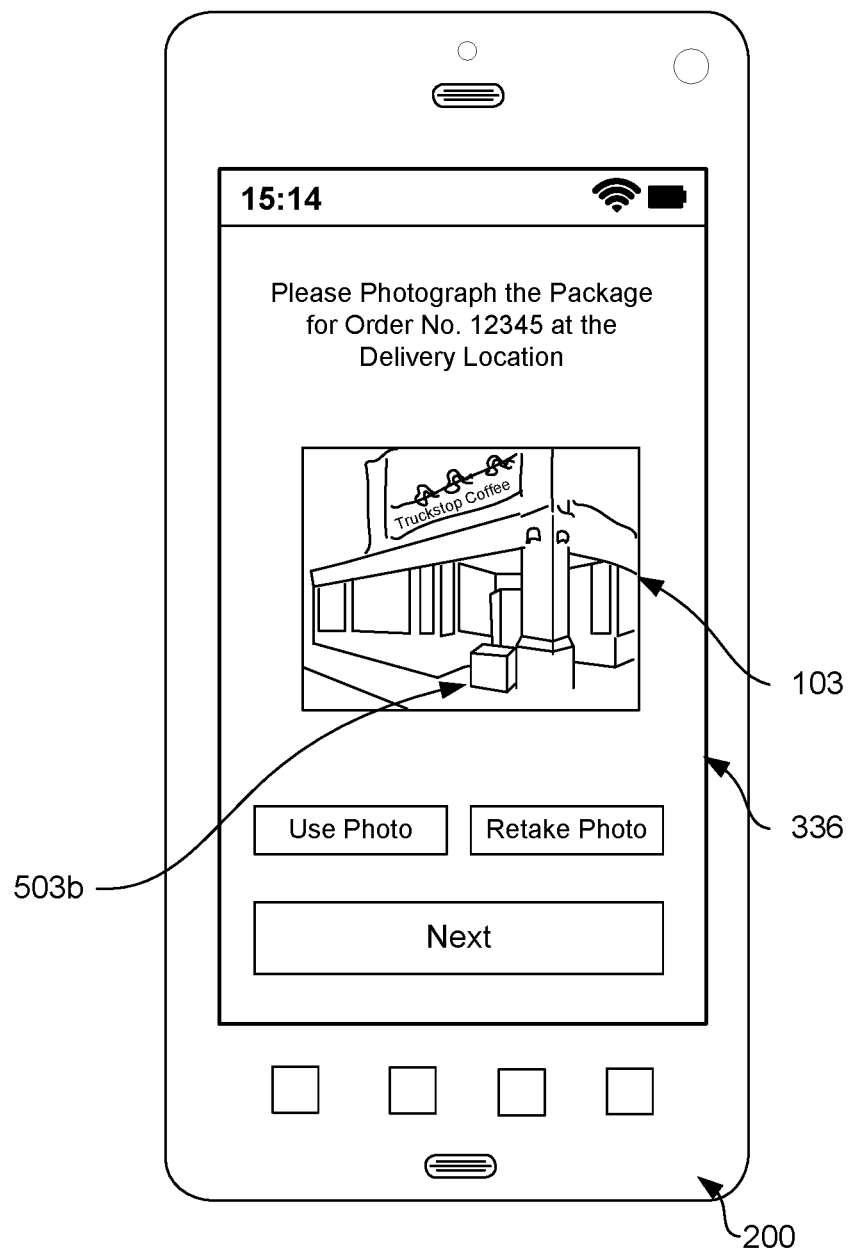
FIG. 5B is a pictorial diagram of an example user interface rendered by a client in the networked environment of FIG. 3 according to various embodiments of the present disclosure.

Turning now to FIG. 5B, shown is an example of the courier user interface 336 rendered by the courier client application 333 (FIG. 3) executing on the courier client device 200, according to various embodiments of the present disclosure. Here, the courier user interface 336 includes a prompt for the courier to confirm delivery of the package 503b of items 319 (FIG. 3) to be delivered. As illustrated, the courier may be prompted to take a photograph, video, or other image 103 of the delivery location 106 (FIG. 3) depicting the package 503b of items 319 at the delivery location 106. Other options or prompts may also be presented, such as a prompt to confirm use of the image 103 or a prompt allowing the image 103 to be retaken. In some instances, the courier may also include various notes or annotations 323 regarding the delivery location 106. For example, the courier may include a note indicating that the package was placed on the front porch of a customer's house instead of by the garage and a reason (e.g., it was raining and the front porch was covered). The note may be represented as text (e.g., a written note), audio (e.g., a voice recording of the courier), video (e.g., a short video illustrating the issue or delivery), or in other forms.

Figure 5C:
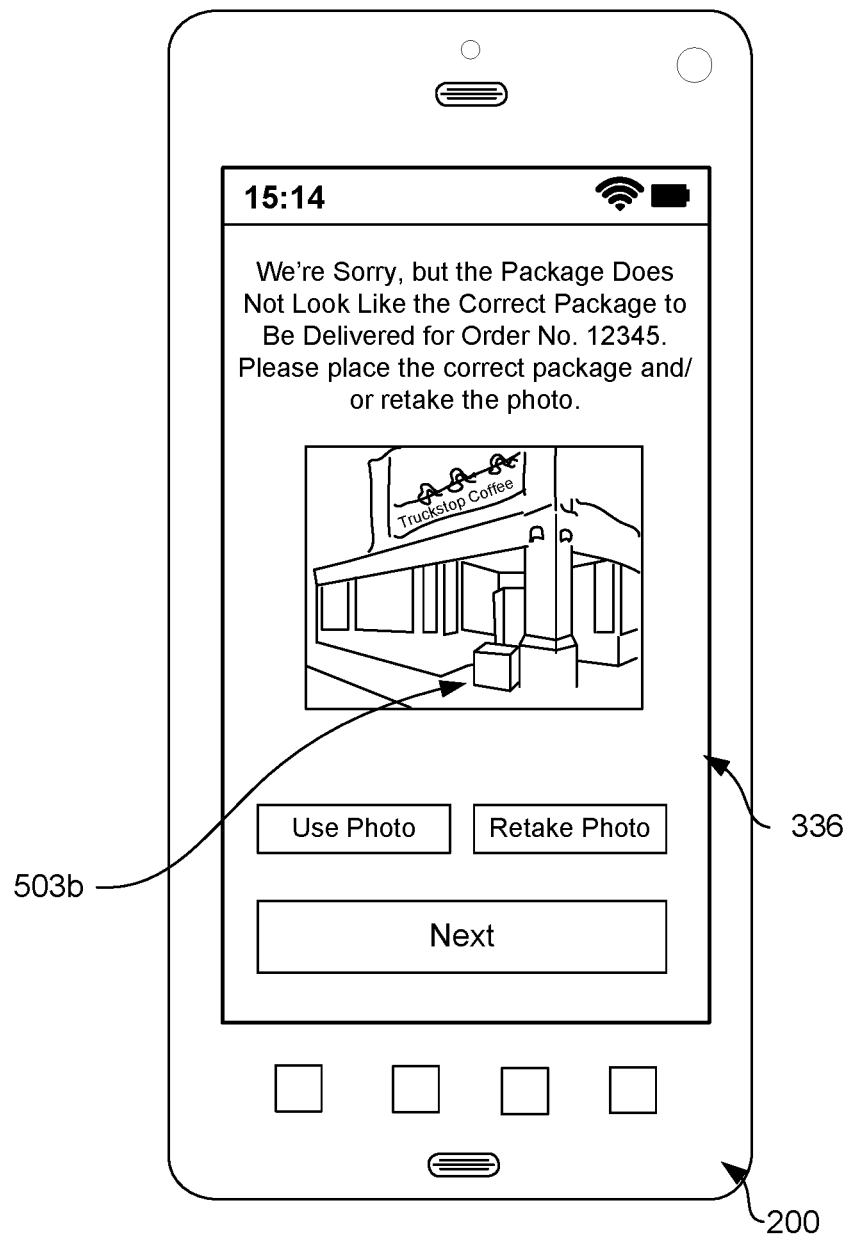
FIG. 5C is a pictorial diagram of an example user interface rendered by a client in the networked environment of FIG. 3 according to various embodiments of the present disclosure.

Moving on to FIG. 5C, shown is an example of the courier user interface 336 rendered by the courier client application 333 (FIG. 3) executing on the courier client device 200, according to various embodiments of the present disclosure. As illustrated, the courier user interface 336 contains an indication that the package 503b delivered may be the incorrect package. This determination may, in some instances, be the result of a poorly taken photograph or other image 103 of the delivery location 106 (FIG. 3). In other instances, this determination may be the result of the characteristics of the package 503b shown in the image 103 not matching the package information 320 (FIG. 3) for the package(s) in which the items 319 (FIG. 3) for the order 316 (FIG. 3) were shipped. In order to address the situation, the courier user interface 336 may prompt the courier to generate a new image 103, for example, from a slightly different angle, distance, or other perspective, or to deliver the correct package and retake the image 103.

Figure 6:
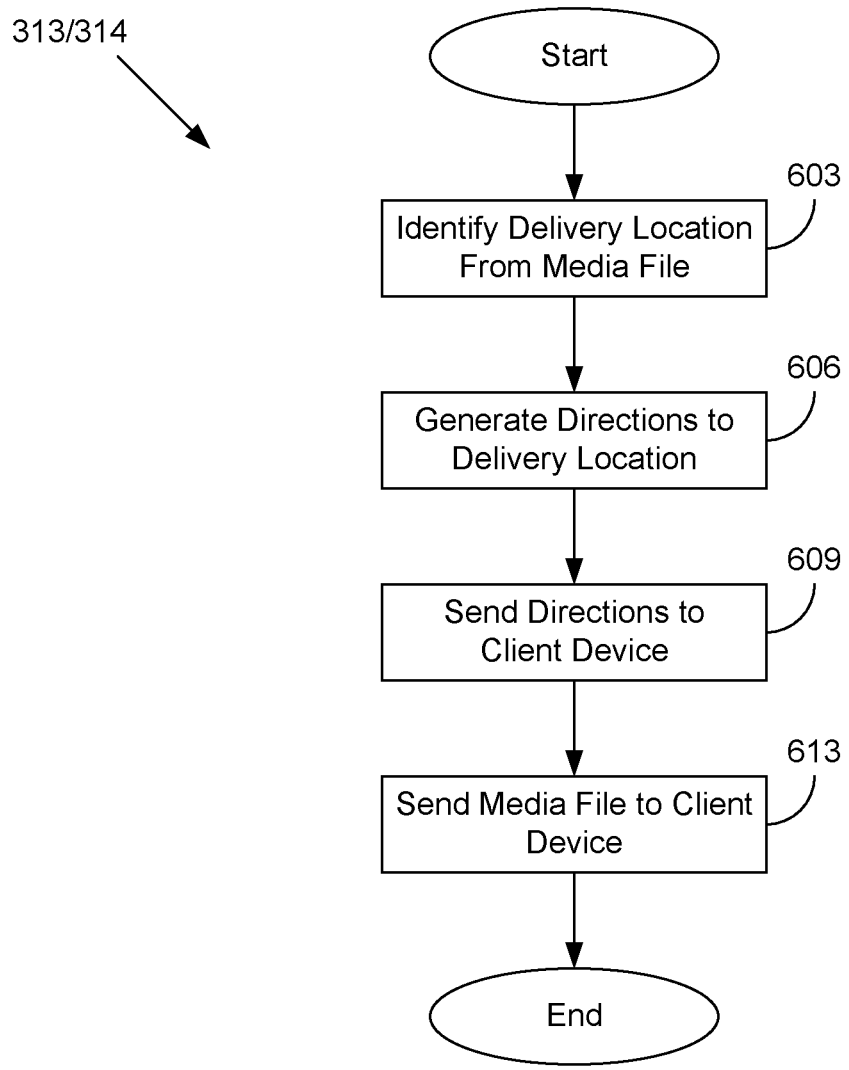
FIG. 6 is a flowchart illustrating one example of functionality implemented as portions of an application executed in a computing environment in the networked environment of FIG. 3 according to various embodiments of the present disclosure.

Referring next to FIG. 6, shown is a flowchart that provides one example of the operation of a portion of the delivery assistance application 313 and/or navigation application 314 according to various embodiments. It is understood that the flowchart of FIG. 6 provides merely an example of the many different types of functional arrangements that may be employed to implement the operation of the portion of the delivery assistance application 313 and/or navigation application 314 as described herein. As an alternative, the flowchart of FIG. 6 may be viewed as depicting an example of elements of a method implemented in the computing environment 303 (FIG. 3) according to one or more embodiments.

Beginning with box, the delivery assistance application 313 receives at least one media file 322 (FIG. 3) from a customer client device 100 (FIG. 3) and identifies the delivery location 106 (FIG. 3) based at least in part upon the media file 322 and any associated annotations 323. The delivery assistance application 313 may use one or more of several approaches to determine the delivery location 106. Several examples of various approaches are discussed below.

As a first example, the delivery assistance application 313 may extract location data from the metadata 324 (FIG. 3) of the media file 322. For example, the delivery assistance application 313 may extract a set of coordinates from the metadata 324 embedded in the media file 322. The delivery assistance application 313 may subsequently compare the extracted coordinates with a set of coordinates that are matched to previously identified locations. For example, the delivery assistance application 313 may compare the extracted coordinates with the set of coordinates to determine that the extracted coordinates match a pair of coordinates that correspond to a specific address (e.g., 1234 Main St., Anytown, Anystate 09876-5432) or to a specific landmark (e.g., a particular park, landmark, road, building, or other location).

As a second example, the delivery assistance application 313 may perform optical character recognition (OCR) on the media data 325 of the media file 322 to determine the delivery location 106 from the media file 322. For example, via OCR, the delivery assistance application 313 may recognize a street number on a house or building. As another example, the delivery assistance application 313 may identify a street name printed on a street sign visible in the image 103 represented by the media data 325.

As a third example, the delivery assistance application 313 may attempt to match the image 103 of the delivery location 106 represented by the media data 325 of the media file 322 with the media data 325 of a second media file 322 that is known to depict a particular delivery location 106. For example, the delivery assistance application 313 may identify one or more edges, corners, ridges, or other image features using one or more machine vision or computer vision techniques, such as canny edge detection, differential edge detection, phase congruency-based edge detection, and various other approaches. The identified edges, corners, ridges, and/or other features are then compared to edges, corners, ridges and/or other features present in the media data 325 of the second media file 322. If the edges, corners, ridges, and/or other features match, then the delivery assistance application 313 may determine that the delivery location 106 for the first media file 322 is the same as the known delivery location 106 of the second media file 322. These approaches may be applied to individual images or individual still frames within a video.

Moving on to box 606, the delivery assistance application 313 and/or navigation application 314 generates a series of directions for a courier to follow from a current location of a courier to the delivery location 106 identified in box 603. The current location of the courier may be previously known. For example, the delivery assistance application 313 and/or navigation application 314 may know where the items 319 (FIG. 3) to be delivered are currently located (e.g., at a store, warehouse, fulfillment center, distribution center, etc.) and can assume that the courier will be delivering the items 319 from that location. In other instances, the courier client device 200 may provide its current location to the delivery assistance application 313 and/or navigation application 314 when the courier has indicated, via the courier client device 200, that the courier is ready to deliver the items 319 to the delivery location 106. In order to generate the series of directions, the delivery assistance application 313 and/or navigation application 314 may receive the current location of the courier and the identified delivery location 106

Proceeding next to box 609, the delivery assistance application 313 and/or navigation application 314 sends the series of directions to a courier client device 200 (FIG. 3) associated with the courier. For example, the delivery assistance application 313 and/or navigation application 314 may send the entire series of directions to the courier client device 200, which may then be cached on the courier client device 200 and presented sequentially via a user interface of the courier client device 200. As another example, the delivery assistance application 313 and/or navigation application 314 may send individual directions in the series of the directions to the courier client device 200 in a piecemeal manner as needed.

Referring next to box 613, the delivery assistance application 313 and/or navigation application 314 may send the media file 322 and any associated annotations 323 to the courier client device 200 in response to receiving an indication that the courier client device 200 is located at or near the delivery location 106. For example, the courier client device 200 may determine that it is located at or near the delivery location 106 and request the media file 322 from the delivery assistance application 313 and/or navigation application 314 at that time. However, in some embodiments, the media file 322 may have been sent concurrently with the directions and cached on the courier client device 200. In such embodiments, when the courier client device 200 determines that it is at or near the delivery location 106, the courier client device 200 may then cause the media file 322 to be rendered on a display 327 of the courier client device 200. Execution of the previously described process subsequently ends.

Figure 7:
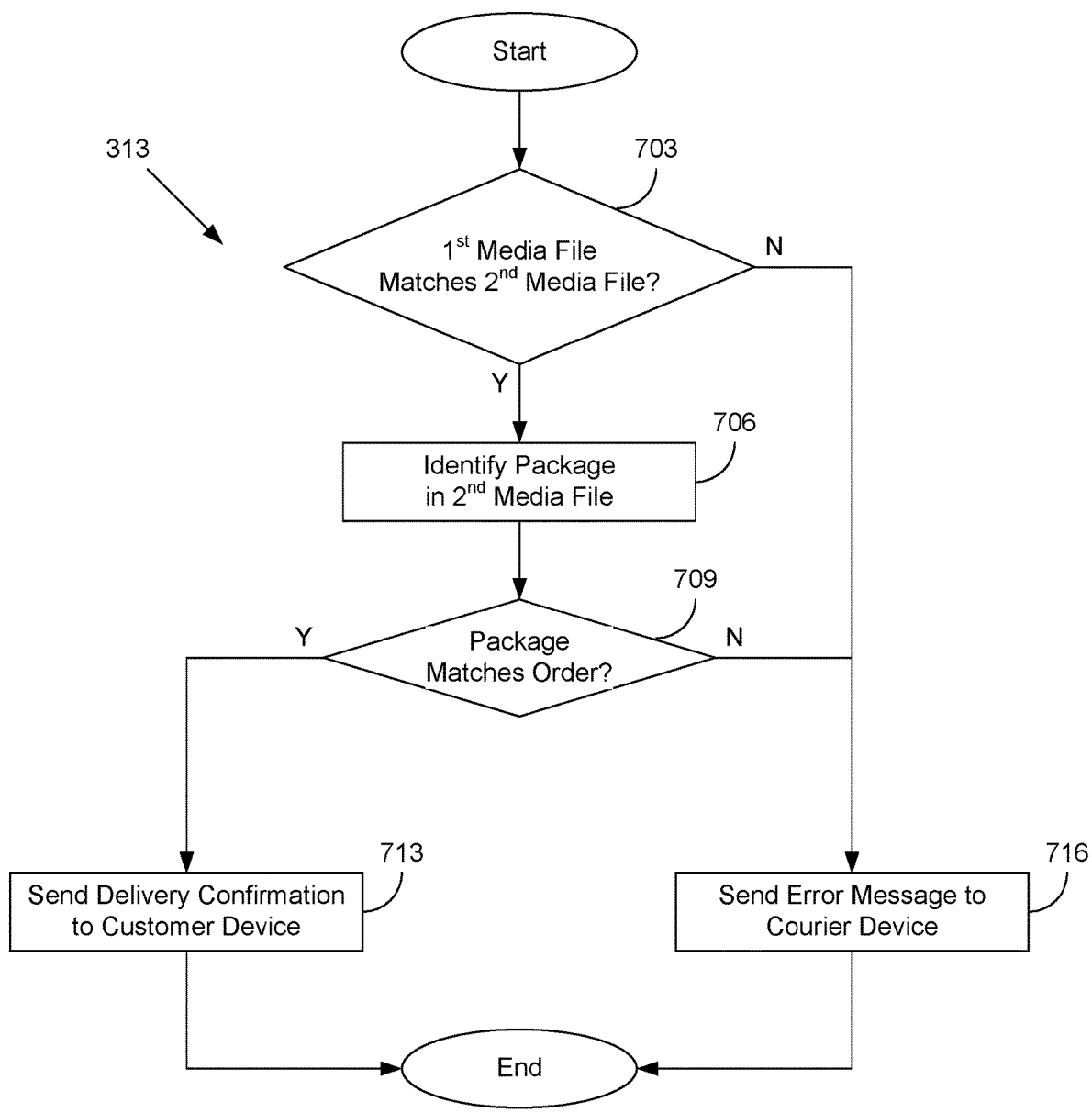
FIG. 7 is a flowchart illustrating one example of functionality implemented as portions of an application executed in a computing environment in the networked environment of FIG. 3 according to various embodiments of the present disclosure.

Referring next to FIG. 7, shown is a flowchart that provides one example of the operation of a portion of the delivery assistance application 313 and/or navigation application 314 according to various embodiments. It is understood that the flowchart of FIG. 7 provides merely an example of the many different types of functional arrangements that may be employed to implement the operation of the portion of the delivery assistance application 313 and/or navigation application 314 as described herein. As an alternative, the flowchart of FIG. 7 may be viewed as depicting an example of elements of a method implemented in the computing environment 303 (FIG. 3) according to one or more embodiments.

The delivery assistance application 313 may compare two media files 322 (FIG. 1) in order to confirm that the correct items 319 (FIG. 3) were delivered at a delivery location 106 (FIG. 3). The first media file 322 may, for example, have been received from a customer client device 100 when a customer provided a media file 322 such as an image 103 (FIG. 1) of the delivery location 106 for the customer's order 316. The second media file 322 may, for example, have been received from a courier client device 200. The second media file 322 may have been generated by the courier as an image 103 (FIG. 2) in order to verify that the items 319 in the order were delivered to the delivery location 106.

Beginning with box 703, the delivery assistance application 313 determines whether the delivery location 106 represented by the first media file 322 matches the delivery location 106 represented by the second media file 322. The delivery assistance application 313 may use a number of approaches, such as those previously described in the discussion of box 603 (FIG. 6) to determine whether the delivery locations 106 represented in the two media files 322 match. If the delivery location 106 represented by the first media file 322 matches the delivery location 106 represented by the second media file 322, then the previously described path of execution of the delivery assistance application 313 proceeds to box 706. However, if the delivery assistance application 313 determines that the delivery location 106 represented by the first media file 322 does not match the delivery location 106 represented by the second media file 322, then the previously described path of execution of the delivery assistance application 313 instead proceeds to box 716, which will be described in further detail herein.

Moving on to box 706, the delivery assistance application 313 identifies the characteristics of a package 503*b* (FIG. 5B) in the image 103 of the delivery location 106 represented by the second media file 322. The delivery assistance application 313 may, for example, use one or more machine vision or computer vision approaches to identify the edges and corners of the package 503b within the image 103. The delivery assistance application 313 may then compare the package 503b with other features identified within image 103 to determine dimensions of the package 503b, such as the length, width, and/or height of the package 503b. In some embodiments, the delivery assistance application 313 may also perform optical character recognition (OCR) on the image 103 to identify text on a shipping label of the package 503b or identifying text on the package itself. The delivery assistance application 313 may also, in some embodiments, determine the color of the package 503b from the image 103. Various other aspects and characteristics of the package 503b may also be identified using various other approaches.

Proceeding to box 709, the delivery assistance application 313 determines whether the characteristics of the package 503b previously identified in box 706 match the package information 320 (FIG. 3) for the order 316. For example, the delivery assistance application 313 may determine whether the color of the package 503b in the image 103 matches the color of the package 503b specified in the package information 320 for the order 316. If the colors do not match, the wrong package 503b may have been delivered. As another example, the delivery assistance application 313 may compare the dimensions of the package 503b determined previously in box 706 with the dimensions specified in the package information 320. If the package 503b is the incorrect size (e.g., too tall, too wide, and/or too long), then the wrong package 503b may have been delivered. As another example, if the name and address on the shipping label of the package 503b do not match the name and address specified in the package information 320, the wrong package 503b may have been delivered. Similarly, if the package information 320 indicates that the contents of the package are fragile, but the package 503b fails to have the word "Fragile" printed on the exterior of the package 503b, the wrong package may have been delivered. If the delivery assistance application 313 determines that the package 503b depicted in the image 103 matches the data specified in the package information 320, then the previously described path of execution of the delivery assistance application 313 proceeds to box 713. However, if the delivery assistance application 313 determines that the package 503b depicted in the image 103 does not match the data specified in the package information 320, the previously described path of execution proceeds to box 716.

Referring next to box 713, the delivery assistance application 313 sends a delivery confirmation message to the customer client device 100. The delivery confirmation message may include a copy of the second media file 322 so that the customer may view the image 103 of the delivery location 106 and confirm that his or her package 403c (FIG. 4C) has in fact been delivered. In some instances, the delivery confirmation message may also include various notes or annotations 323 regarding the delivery. For example, the courier may have included a note indicating that the package was placed on the front porch of a customer's house instead of by the garage and a reason (e.g., it was raining and the front porch was covered). The note may be represented as text (e.g., a written note), audio (e.g., a voice recording of the courier), video (e.g., a short video illustrating the issue or delivery), or in other forms. In various embodiments, the delivery confirmation may also include an image (e.g., a photograph) of the courier who delivered the package. Such a photo may have been retrieved, for example, from the profile for the courier stored in the data store 309 (FIG. 3) of the computing environment 303 (FIG. 3). After sending the delivery confirmation message, the previously described path of execution of the delivery assistance application 313 subsequently ends.

However, if execution instead proceeds to box 716, then the delivery assistance application 313 causes an error message or error code to be sent to the courier client device 200, which may then be rendered within the courier user interface 336 on the display 327 of the courier client device 200. The error message may, for example, prompt the courier to take a new photograph or video of the package 503b at the delivery location 106. The error message may, for example, inform the courier that the wrong items 319 or package 503b appears to have been delivered and request that the courier deliver the correct items 319 and/or correct package 503b. After sending the error message or error code, the previously described path of execution of the delivery assistance application 313 subsequently ends.

Figure 8:
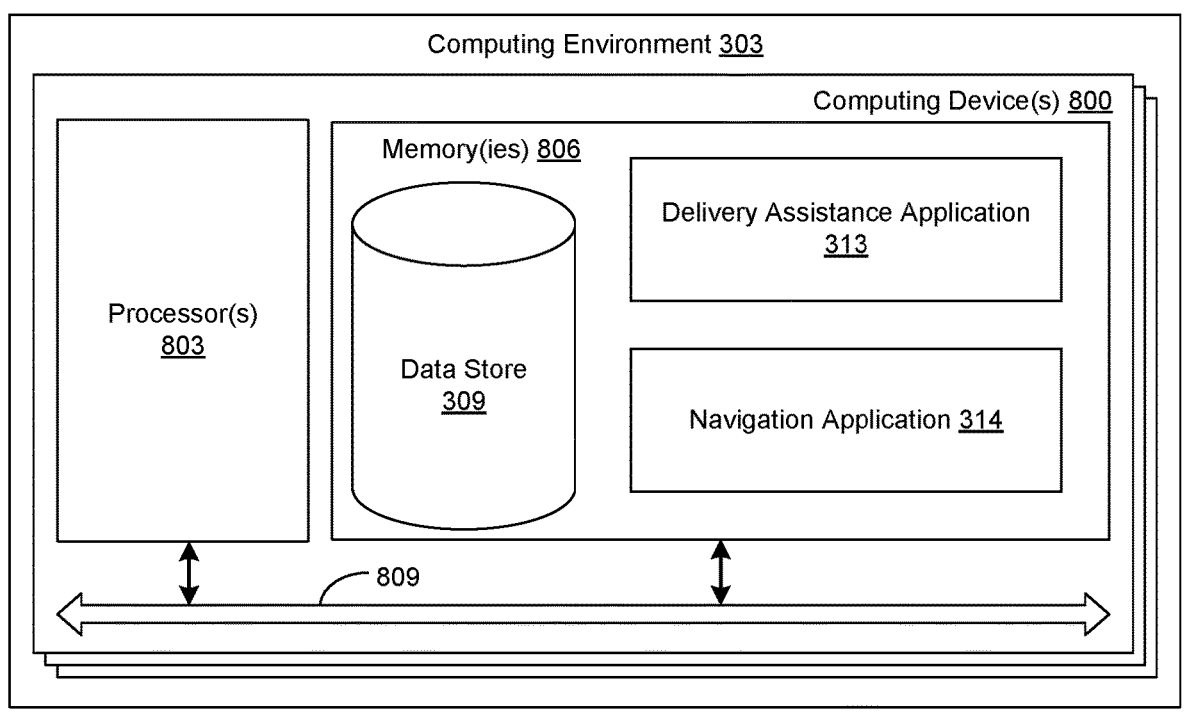
FIG. 8 is a schematic block diagram that provides one example illustration of a computing environment employed in the networked environment of FIG. 3 according to various embodiments of the present disclosure.

With reference to FIG. 8, shown is a schematic block diagram of the computing environment 303 according to an embodiment of the present disclosure. The computing environment 303 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are delivery assistance application 313, navigation application 314, and potentially other applications. Also stored in the memory 806 may be a data store 309 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the delivery assistance application 313, navigation application 314 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6 and 7 show the functionality and operation of an implementation of portions of the delivery assistance application 313 and/or navigation application 314. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. Further, in some embodiments, one or more of the blocks shown in FIGS. 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the delivery assistance application 313 and/or navigation application 314, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the delivery assistance application 313 and/or navigation application 314, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices in the same computing environment 303. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein the program comprises instructions that cause the at least one computing device to at least:
   extract a first location from metadata embedded in a first image file, wherein the first image file is received from a first client device;
   match the first location depicted in the first image file to a second location depicted in a second image file, wherein the second image file is received from a second client device and the second image file includes a package that has been delivered for a purchase order;
   identify an image feature from the second image file using a computer vision technique;
   determine a package dimension of the package in the second image file in response to a determination that the first location depicted in the first image file matches the second location depicted in the second image file, the package dimension is determined based at least in part on the image feature, the image feature comprising at least one of a set of edges or corners of the package in the second image file;
   determining that the package dimension of the package corresponds to at least one dimension associated with the purchase order; and
   confirm a delivery of the package based at least in part on a determination that the package dimension of the package in the second image file matches the at least one dimension associated with the purchase order.

2. The non-transitory computer-readable medium of claim 1, wherein extracting the first location from metadata embedded in the first image file further comprises:
   extracting a first set of coordinates from metadata embedded in the first image file; and
   extracting a second set of coordinates from metadata embedded in the second image file.

3. The non-transitory computer-readable medium of claim 1, wherein determining that the package dimension of the package corresponds to the at least one dimension associated with the purchase order further comprises:
   comparing the set of edges or corners to a second set of edges or corners of a third image file associated with the purchase order.

4. A system, comprising:
   at least one computing device; and
   an application executed in the at least one computing device, wherein the application is configured to cause the at least one computing device to at least:
      extract a first location from metadata embedded in a first image file, wherein the first image file is received from a first client device;
      match the first location depicted in the first image file to a second location depicted in a second image file, wherein the second image file is received from a second client device;
      determine a package dimension of a package in the second image file in response to a determination that the first location depicted in the first image file matches the second location depicted in the second image file, the package dimension is determined based at least in part on at least one of a set of edges or corners of the package identified in the second image file;
      determine the package dimension of the package corresponds to package information associated with a purchase order; and
      confirm a delivery of the package based at least in part on a determination that the package dimension of the package in the second image file matches the package information associated with the purchase order.

5. The system of claim 4, wherein matching the first location depicted in the first image file to the second location depicted in the second image file further comprises:
   identifying a second set of edges or corners of a second delivery location in the second image file; and
   comparing the set of edges or corners to the second set of edges or corners.

6. The system of claim 4, wherein matching the first location depicted in the first image file to the second location depicted in the second image file further comprises:
   identifying a portion of a first mailing address depicted in the second image file, wherein the portion of the first mailing address is identified using optical character recognition (OCR); and
   comparing the portion of the first mailing address to a second mailing address associated with the purchase order.

7. The system of claim 4, wherein determining that the package dimension of the package corresponds to the package information associated with the purchase order further comprises:
   comparing the set of edges or corners to a second set of edges or corners of a third image file associated with the purchase order.

8. The system of claim 4, wherein matching the first location depicted in the first image file to the second location depicted in the second image file further comprises:
   extracting a second set of coordinates from metadata embedded in the second image file; and
   comparing a first set of coordinates to the second set of coordinates, wherein the first set of coordinates is associated with the first location.

9. The system of claim 8, wherein the metadata embedded in the first image file comprises a version of an exchangeable image file format (Exif) standard.

10. The system of claim 4, wherein determining the package dimension of the package in the second image file further comprises comparing a first color of the package depicted in the second image file to a second color of the package information associated with the purchase order.

11. The system of claim 4, wherein confirming the delivery of the package further comprises sending an electronic message to the first client device.

12. The system of claim 11, wherein the electronic message sent to the first client device to confirm the delivery includes the second image file.

13. The system of claim 4, wherein determining the package dimension of the package in the second image file further comprises:
- determining the dimension of the package in the second image file based at least in part on a set of corners or edges of the package; and
- comparing the dimension of the package to the package information associated with the purchase order.

14. A method, comprising:
- extracting, via a computing device, a first location from metadata embedded in a first media file, wherein the first media file is provided by a first client device;
- comparing, via the computing device, the first media file with a second media file to determine that a first location depicted in the first media file matches a second location depicted in the second media file, wherein the second media file is provided by a second client device;
- determining, via the computing device, a package dimension of a package in the second media file in response to a determination that the first location depicted in the first media file matches the second location depicted in the second media file, the package dimension is determined based at least in part on at least one of a set of edges or corners of the package identified in the second media file;
- determining, via the computing device, that the package dimension of the package corresponds to package information associated with a purchase order; and
- confirming, via the computing device, a delivery of the package based at least in part on the determination that the package dimension corresponds to the package information associated with the purchase order.

15. The method of claim 14, wherein determining the package dimension of the package further comprises:
- determining the dimension of the package in the second media file; and
- comparing the dimension of the package to the package information associated with the purchase order.

16. The method of claim 14, wherein at least one of the first media file or the second media file comprises a video file.

17. The method of claim 14, wherein determining that first location depicted in the first media file matches the second location depicted in the second media file further comprises:
- determining that the second media file includes a user-specified delivery location identified in the first media file.

18. The method of claim 14, wherein determining that the location depicted in the first media file matches the location depicted in the second media file by:
- extracting a first set of image features from the first media file, wherein the first set of image features comprises at least one of: a first edge, a first corner, or a first ridge;
- extracting a second set of image features from the second media file, wherein the second set of image features comprises at least one of: a second edge, a second corner, or a second ridge; and
- determining that the first set of image features matches the second set of image features.

19. The method of claim 14, wherein confirming the delivery of the package further comprises sending an electronic message to the first client device.

20. The method of claim 14, wherein confirming the delivery of the package further comprising:
- determining a first color of the package in the second media file using a computer vision technique or a machine vision technique; and
- comparing the first color of the package depicted in the second media file to a second color of the package information associated with the purchase order.

* * * * *